US008007149B2

(12) United States Patent
Nagasawa et al.

(10) Patent No.: US 8,007,149 B2

(45) Date of Patent: Aug. 30, 2011

(54) VEHICLE LIGHTING ASSEMBLY AND LIGHT GUIDING LENS FOR USE IN VEHICLE LIGHTING ASSEMBLY

(75) Inventors: Satoshi Nagasawa, Tokyo (JP); Hidetaka Okada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 287 days.

(21) Appl. No.: 12/180,707

(22) Filed: Jul. 28, 2008

(65) Prior Publication Data

US 2009/0027910 A1 Jan. 29, 2009

(30) Foreign Application Priority Data

Jul. 27, 2007 (JP) ................................ 2007-196090

(51) Int. Cl.
*F21V 5/00* (2006.01)
*B60Q 1/28* (2006.01)

(52) U.S. Cl. ......... 362/511; 362/507; 362/522; 362/538

(58) Field of Classification Search .................. 362/507, 362/510, 511, 522, 518, 538, 545
See application file for complete search history.

(56) References Cited

U.S. PATENT DOCUMENTS

| | | | | |
|---|---|---|---|---|
| 6,769,798 | B2 * | 8/2004 | Mishimagi | 362/522 |
| 6,955,459 | B2 * | 10/2005 | Mochizuki et al. | 362/602 |
| 7,025,482 | B2 * | 4/2006 | Yamashita et al. | 362/511 |
| 7,255,464 | B2 * | 8/2007 | Rodriguez Barros et al. | 362/494 |
| 7,484,869 | B2 * | 2/2009 | Kogo et al. | 362/538 |

FOREIGN PATENT DOCUMENTS

| | | |
|---|---|---|
| JP | 2003338210 | * 11/2003 |
| JP | 2006313681 | 11/2006 |

* cited by examiner

*Primary Examiner* — Jong-Suk (James) Lee
*Assistant Examiner* — Peggy A. Neils
(74) *Attorney, Agent, or Firm* — Kenealy Vaidya LLP

(57) ABSTRACT

A vehicle lighting assembly is provided which uses a light guiding lens without a dedicated light source. The vehicle lighting assembly can include: a light source configured to emit light rays used at least for forming a target light distribution; a light guiding member made of a transparent or semi-transparent material, the light guiding member including a plurality of individual reflective light emitting surfaces configured to be illuminated with light rays entering the light guiding member from the light source, the light guiding member including another reflective light emitting surface configured to be illuminated with parallel light rays entering the light guiding member; and a reflector having a first reflective surface configured to reflect light rays emitted from the light source for use in forming the target light distribution and a second reflective surface configured to adjust a leak portion of light rays that are not for use in forming the target light distribution so that the leak portion of light rays are made parallel with each other.

18 Claims, 6 Drawing Sheets

VEHICLE LIGHTING ASSEMBLY AND LIGHT GUIDING LENS FOR USE IN VEHICLE LIGHTING ASSEMBLY

This application claims the priority benefit under 35 U.S.C.§119 of Japanese Patent Application No. 2007-196090 filed on Jul. 27, 2007, which is hereby incorporated in its entirety by reference.

BACKGROUND

1. Technical Field

The presently disclosed subject matter relates to vehicle lighting assemblies and light guiding lenses for use in the vehicle lighting assembly, and in particular, to a vehicle lighting assembly which uses a light guiding lens without a dedicated light source.

2. Related Art

Several conventional vehicle lighting assemblies using a light guiding lens have been known. One example thereof is disclosed in Japanese Patent Laid-Open Application No. 2006-313681.

The vehicle lighting assembly disclosed in Japanese Patent Laid-Open Application No. 2006-313681 includes a light guiding lens having a plurality of reflecting surfaces and a light source disposed below the light guiding lens. According to this configuration, light rays emitted from the light source can enter the light guiding lens, and are reflected by the plurality of reflecting surfaces to be radiated in respective predetermined direction for illumination.

This type of vehicle lighting assembly, however, must include a dedicated light source for this light guiding lens. Accordingly, a space for accommodating such a dedicated light source must be secured within a vehicle lighting assembly without obstructing a light path for light rays emitted from a main light source. The requirement of such a dedicated light source can increase the entire cost for components as well as manufacturing cost of the vehicle lighting assembly.

SUMMARY

The presently disclosed subject matter was devised in view of these and other characteristics, features, and problems in association with the conventional art. According to an aspect of the presently disclosed subject matter, a vehicle lighting assembly is provided with a light guiding lens which does not require any dedicated light source.

According to another aspect of the presently disclosed subject matter, a vehicle lighting assembly can include: a light source configured to emit light rays used at least for forming a target light distribution; a light guiding member made of a transparent or semi-transparent material, the light guiding member including a plurality of individual reflective light emitting surfaces configured to be illuminated with light rays entering the light guiding member from the light source and another reflective light emitting surface configured to be illuminated with parallel light rays entering the light guiding member; and a reflector having a first reflective surface configured to reflect light rays emitted from the light source for use in forming the target light distribution and a second reflective surface configured to adjust part of light rays not for use in forming the target light distribution so that the light rays are made parallel with each other.

According to the above aspect of the presently disclosed subject matter, the light guiding member (or light guiding lens) can include a plurality of individual reflective light emitting surfaces and another reflective light emitting surface. The individual reflective light emitting surfaces can be illuminated with a portion of the light rays which are emitted from the light source and enter the light guiding member as direct light rays and which are not used for the formation of the target light distribution (so-called "leakage light (rays)") so that the individual reflective light emitting surfaces can reflect the light rays and accordingly can be observed as if they can emit light by themselves. The other reflective light emitting surface can be illuminated with part of the light rays which are emitted from the light source and are reflected by the reflector so as to enter the light guiding member as parallel light rays (these light rays are also so-called "leakage light (rays)" because they are not used for the formation of the target light distribution) so that the reflective light emitting surface can reflect the light rays and accordingly can be observed as if it can emit light by itself. Therefore, it is possible to provide a vehicle lighting assembly using a light guiding lens which does not require any dedicated light source. Furthermore, the assembly can effectively utilize the light rays emitted from the light source (so-called "leakage light"), otherwise the light rays cannot be efficiently utilized for illumination.

In the above vehicle lighting assembly, the light guiding member can include: a plate light guiding portion extending in a predetermined direction; an incident light guiding portion provided along one end of the plate light guiding portion, the incident light guiding portion configured to receive light rays from the light source; and a reflective surface provided between the plate light guiding portion and the incident light guiding portion, the reflective surface configured to reflect the light rays entering the incident light guiding portion towards the plate light guiding portion. The individual reflective light emitting surfaces can be provided on the plate light guiding portion in a direction crossing the predetermined direction, and can be configured to be illuminated with light rays reflected by the reflective surface provided between the plate light guiding portion and the incident light guiding portion. The another reflective light emitting surface can be disposed along the opposite end of the plate light guiding portion to the incident light guiding portion, and can be configured to be illuminated with the parallel light rays reflected by the reflective surface between the plate light guiding portion and the incident light guiding portion.

According to the above configured light guiding member (or light guiding lens), the plurality of individual reflective light emitting surfaces (which are arranged in the plate light guiding member in a direction crossing the predetermined direction in which the plate light guiding member extends) can be illuminated with direct light rays entering the light guiding member from the light source (which are not used for the formation of the target light distribution, so-called "leakage light (rays)") so that the individual reflective light emitting surfaces can reflect the light rays and accordingly can be observed as if they can emit light by themselves. The other reflective light emitting surface (which can be arranged along the other end of the plate light guiding portion opposite to the end where the incident light guiding portion is provided) can be illuminated with part of the light rays which are emitted from the light source and are reflected by the reflector so as to enter the light guiding member as parallel light rays (these light rays are also so-called "leakage light (rays)" because they are not used for the formation of the target light distribution) so that the reflective light emitting surface can reflect the light rays and accordingly can be observed as if it can emit light by itself. Accordingly, the other reflective light emitting surface and the individual reflective light emitting surfaces which can cross the other reflective light emitting surface can be observed as if they emit light. Among other features, this configuration can provide a novel appearance.

According to still another aspect of the presently disclosed subject matter, a vehicle lighting assembly having a forward illumination direction can include: a projector type headlight section and a reflector type headlight section provided near or adjacent to the projector type headlight section. The reflector type headlight section can include: a light source having an optical axis disposed downward so that the optical axis is aligned to a direction perpendicular to the illumination direction; a reflector provided below the light source, the reflector having a main reflection section and a second reflection section, the main reflection section configured to reflect light rays emitted from the light source substantially in the optical axis direction toward the illumination direction to form a desired light distribution, the second reflection section configured to reflect light rays emitted from the light source substantially in directions other than the optical axis direction toward a predetermined direction as parallel light rays; and a light guiding member provided adjacent to the light source in the illumination direction which is perpendicular to the optical axis of the light source. The light guiding member can be integrally composed of: an incident light guiding portion facing towards the light source and configured to receive light rays emitted from the light source directly or parallel light rays reflected by the second reflection section; a plate light guiding portion extending in a predetermined direction with respect to the incident light guiding portion; a first reflective surface provided between the incident light guiding portion and the plate light guiding portion for guiding light rays from the incident light guiding portion to the plate light guiding portion; a plurality of individual reflective light emitting surfaces provided in the plate light guiding portion, configured to reflect part of the light from the first reflective surface towards the illumination direction; and a second reflective surface serving as another reflective light emitting surface provided in the plate light guiding portion at an opposite end of the plate light guiding portion with respect to the end where the first reflective surface is provided, the other reflective light emitting surface configured to be illuminated with the light rays from the first reflective surface and to reflect the light rays in the illumination direction.

In the above vehicle lighting assembly, the light guiding member can have an L-shaped cross section, and respective sides of the L-shaped cross section correspond to the incident light guiding portion and the plate light guiding portion.

In the above vehicle lighting assembly, the plurality of individual reflective light emitting surfaces can be formed on a rear surface of the plate light guiding portion with respect to the illumination direction.

In the above vehicle lighting assembly, the first reflective surface can be provided at an angle of 45 degrees with respect to the optical axis of the light source, and the second reflective surface can be provided at an angle of 45 degrees with respect to the optical axis and can be substantially parallel to the first reflective surface.

According to still another aspect of the presently disclosed subject matter, a light guiding lens (or light guiding member) for use in a vehicle lighting assembly can include: a plate light guiding portion extending in a predetermined direction; an incident light guiding portion provided along one end of the plate light guiding portion, the incident light guiding portion configured to receive light rays from the light source; a reflective surface provided between the plate light guiding portion and the incident light guiding portion, the reflective surface configured to reflect the light rays entering the incident light guiding portion towards the plate light guiding portion; a plurality of individual reflective light emitting surfaces provided on the plate light guiding portion in a direction crossing the predetermined direction, the individual reflective light emitting surfaces configured to be illuminated with light rays reflected by the reflective surface provided between the plate light guiding portion and the incident light guiding portion; and another reflective light emitting surface provided along an opposite end of the plate light guiding portion with respect to the incident light guiding portion, the reflective light emitting surface configured to be illuminated with parallel light rays reflected by the reflective surface between the plate light guiding portion and the incident light guiding portion.

In the above light guiding lens or member, the plurality of individual reflective light emitting surfaces can be illuminated with direct light rays entering the light guiding member from the light source (which are not used for the formation of the target light distribution, so-called "leakage light (rays)") so that the individual reflective light emitting surfaces can reflect the light rays and accordingly can be observed as if they can emit light by themselves. The other reflective light emitting surface can be illuminated with a portion of the light rays entering the light guiding member as parallel light rays (these light rays are also so-called "leakage light (rays)" because they are not used for the formation of the target light distribution) so that the reflective light emitting surface can reflect the light rays and accordingly can be observed as if it can emit light by itself. Therefore, it is possible to provide a vehicle lighting assembly using a light guiding lens which does not require any dedicated light source. Furthermore, it can effectively utilize the light rays emitted from the light source (so-called "leakage light"), otherwise the light rays cannot be efficiently utilized for illumination.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

A description will now be made below with respect to vehicle lighting assemblies of the presently disclosed subject matter with reference to the accompanying drawings and in accordance with certain exemplary embodiments.

The vehicle lighting assemblies of the presently disclosed subject matter can be applied to a vehicle headlight, a signal light, an auxiliary light, a rear light, and the like for use in a vehicle. In the exemplary embodiment described below, the vehicle lighting assembly is applied to a vehicle headlight.

Figure 1:
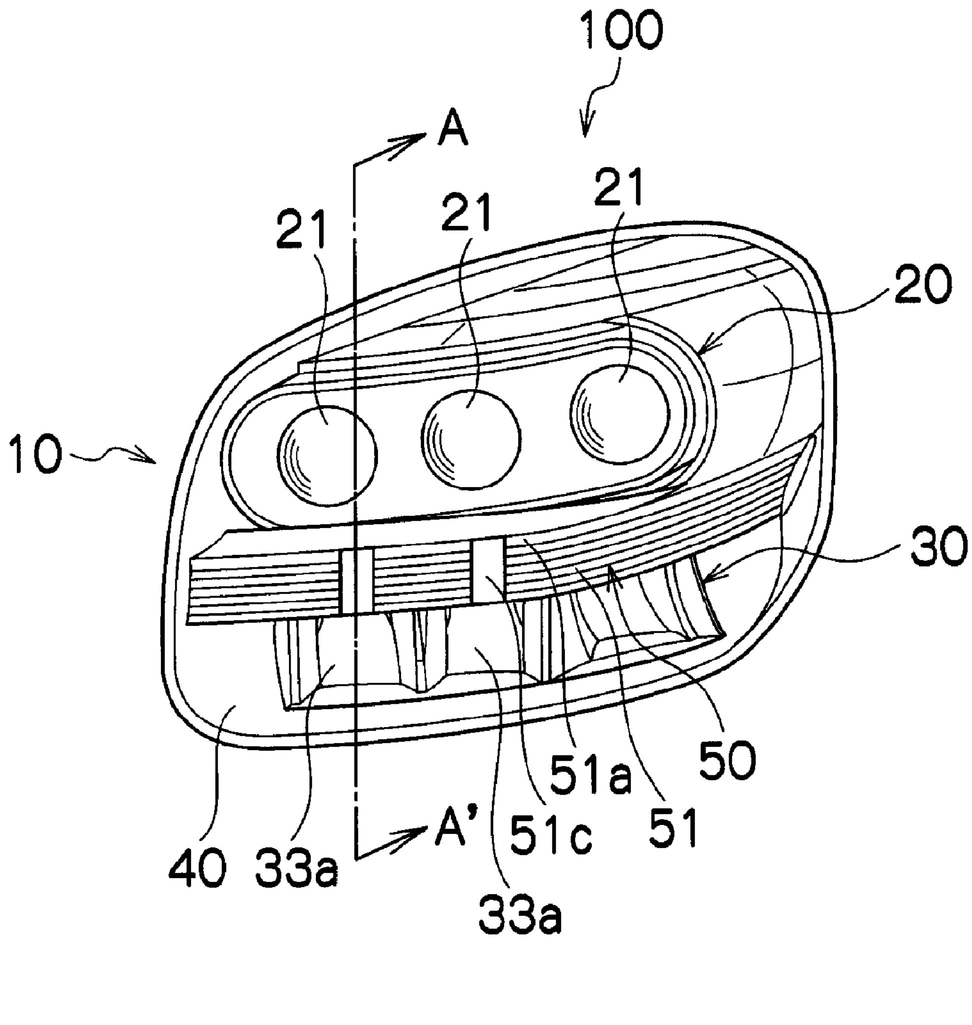
FIG. 1 is a perspective view of an exemplary embodiment of a vehicle lighting assembly made in accordance with principles of the presently disclosed subject matter.
Figure 2:
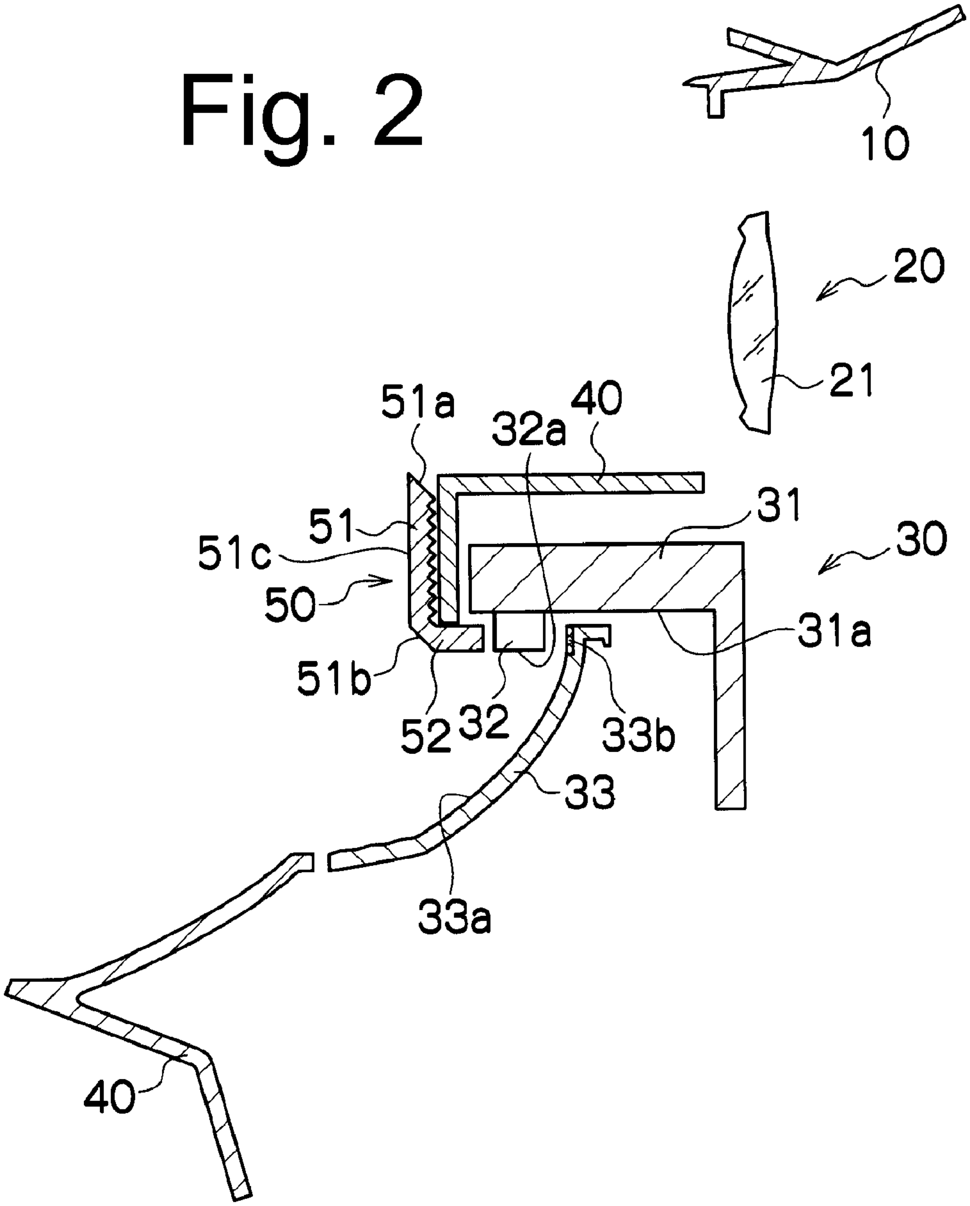
FIG. 2 is a cross sectional view showing the vehicle lighting assembly of FIG. 1 taken along line A-A'.

FIG. 1 is a perspective view showing an example of a vehicle lighting assembly made in accordance with principles of the presently disclosed subject matter. FIG. 2 is a cross sectional view taken along line A-A' of the vehicle lighting assembly of FIG. 1.

As shown in FIGS. 1 and 2, the vehicle lighting assembly 100 can include a housing 10, a projector type headlight section 20, a reflector type headlight section 30, an extension 40, and a light guiding lens or portion 50.

The projector type headlight section 20 can be used for forming a target light distribution pattern for a low bean in cooperation with the reflector type headlight section 30. The projector type headlight section 20 can include common components of a typical projector type headlight, including a shade, a light source such as a bulb (incandescent bulb, HID or the like) or an LED, an elliptic reflector (which are not shown in the drawing), and a projection lens 21.

In the projector type headlight section 20 configured as described above, the light rays emitted from the light source can be reflected by the not-shown elliptic reflector and gathered at a focus of the reflector located near the upper edge of the not-shown shade. Then, the light rays can be radiated through the projection lens 21 in a forward direction to thereby form a part of the target light distribution pattern.

FIG. 2 and other drawings show the reflector type headlight section 30 which can include a light source 32 for forming the target light distribution. In the present exemplary embodiment, an LED is employed as the light source 32 (hereinafter, referred to as "LED 32"). The LED 32 can be disposed on the rear surface of a horizontal face 31*a* of the base 31. It should be noted that the base 31 can have a heat dissipation function for dissipating generated heat or the like. Furthermore, a reflector 33 can be disposed below the LED 32. The LED 32 can have an optical axis which coincides with the vertical axis (substantially perpendicular to the optical axis or the illumination direction of the vehicle lighting assembly) and a light emitting surface 32*a* for emitting light rays and illuminating the below-disposed reflector 33. In the present exemplary embodiment, the LED 32 can be provided to face towards the reflector 33, and this combination of reflector 33 and LED 32 can be provided in plural.

The reflector 33 can include a reflective surface 33*a* (for example, a parabolic reflective surface) and another (second) reflective surface 33*b*. The reflective surface 33*a* can reflect light rays which are emitted from the LED 32 and are used for forming a target light distribution (light rays for forming the target light distribution pattern). The reflective surface 33*b* can reflect part of light rays which are emitted from the LED 32 and which are not used for forming the target light distribution (these are so-called "leakage light (rays)"), to make the reflected light rays parallel to each other for entering the light guiding lens 50.

In the reflector type headlight section 30 as configured above, the light rays emitted from the LED 32 can be reflected by the reflective surface 33*a* of the reflector 33 to be radiated forward and form part of the target light distribution pattern.

The projector type headlight section 20 and the reflector type headlight section 30, as shown in FIG. 1, can be fixed to a bracket or the like (not shown) into a unit, and the united sections 20 and 30 can be fixed to the housing 10. The united components can be covered with the extension 40 mainly for the purpose of decoration while the lens 21, the reflector 33, and the like are exposed. In the present exemplary embodiment, the light guiding lens 50 can be provided between the projector type headlight section 20 and the reflector type headlight section 30 at the extension 40.

The light guiding lens 50 can be formed of a transparent or semi-transparent material, such as acrylic resin or polycarbonate resin, by injection molding. The light guiding lens 50 can be composed of, as shown in FIGS. 2 and 4, a plate light guiding portion 51, an incident light guiding portion 52, an upper total reflective surface 51*a*, and a lower total reflective surface 51*b*.

Figure 4:
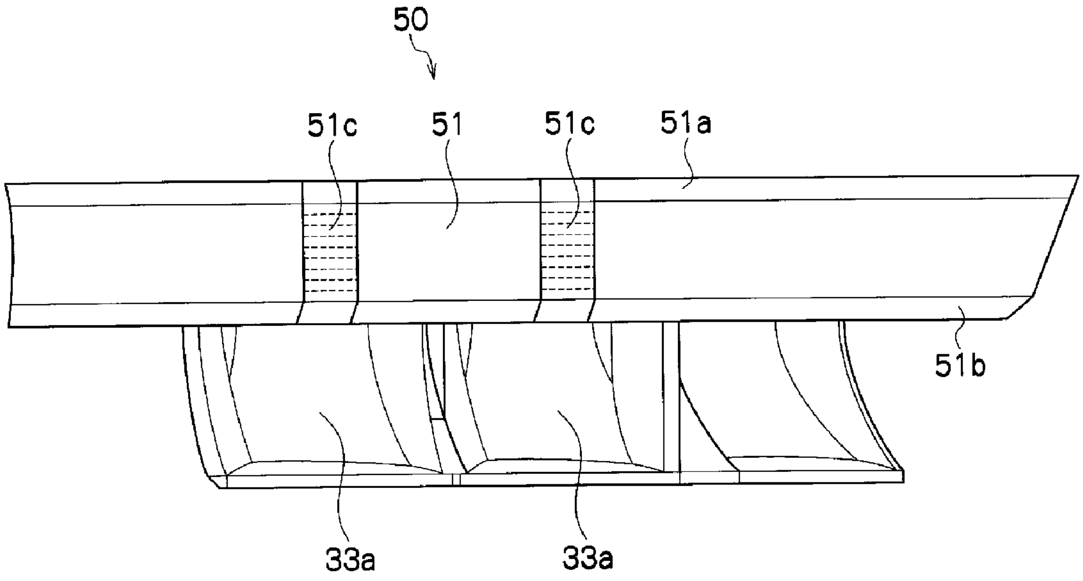
FIG. 4 is a partial perspective view illustrating the configuration of the portion around the reflector of the lighting assembly of FIG. 1.

As shown in FIGS. 1, 2 and 4, the plate light guiding portion 51 can have a shape following the surface shape of the extension 40 between the projector type headlight section 20 and the reflector type headlight section 30, so as to extend from the center of a vehicle body to the side area of the vehicle body.

The upper total reflective surface 51*a* can be provided at the upper end of the plate light guiding portion 51 and can be inclined with respect to the vertical direction at an angle of approximately 45 degrees. The upper total reflective surface 51*a* may be referred to as a "transversal light emitting portion 51*a*," which corresponds to and is one example of a "reflective light emitting surface." The incident light guide portion 52 can be provided at the lower end of the plate light guiding portion 51 for allowing parallel light rays from the reflective surface 33*b* of the reflector or direct light rays from the LED 32 to enter.

As shown in FIGS. 2 and 4, the lower total reflective surface 51*b* can be provided between the plate light guiding portion 51 and the incident light guiding portion 52 at the lower end of the plate light guiding portion 51, and can be inclined with respect to the vertical direction at an angle of approximately 45 degrees. The lower total reflective surface 51*b* can reflect parallel light rays from the reflective surface 33*b* of the reflector or direct light rays from the LED 32, which have entered the incident light guiding portion 52, towards the plate light guiding portion 51 (i.e., the lower total reflective surface 51*b* can change the direction of light transmitting though the light guiding lens 50 from a direction that extends through and along a longitudinal central axis of the incident light guiding portion 52 to a direction that extends in a direction through and along a central longitudinal axis of the plate light guiding portion 51).

Figure 3:
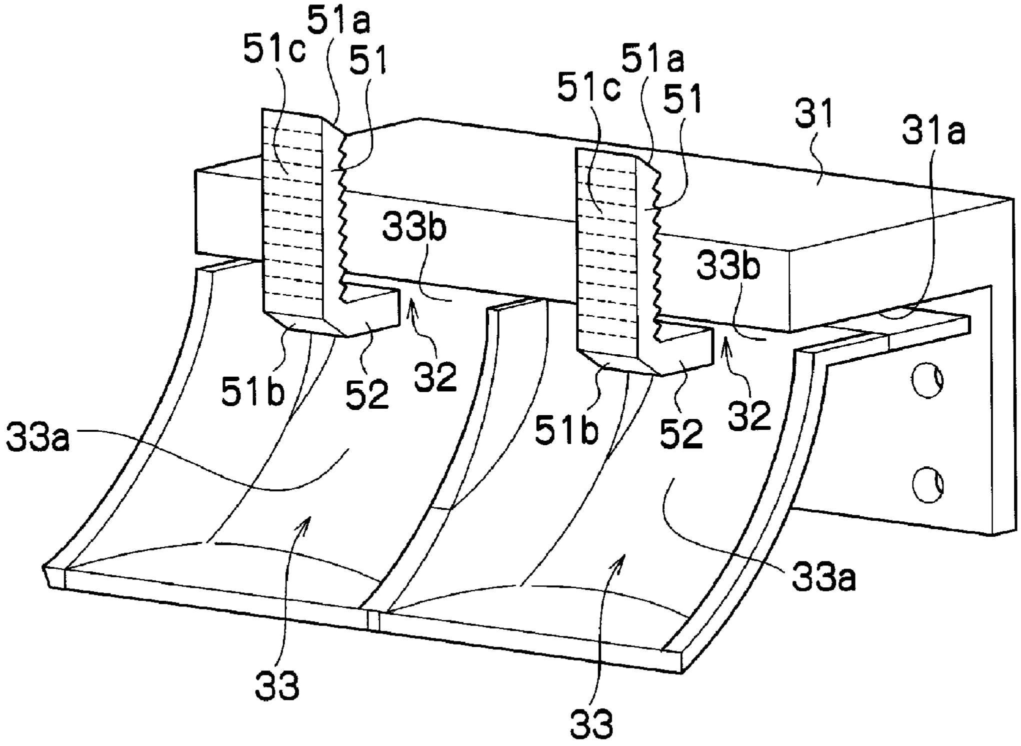
FIG. 3 is a partial perspective view illustrating the configuration of the portion around the reflector of the lighting assembly of FIG. 1.
Figure 5:
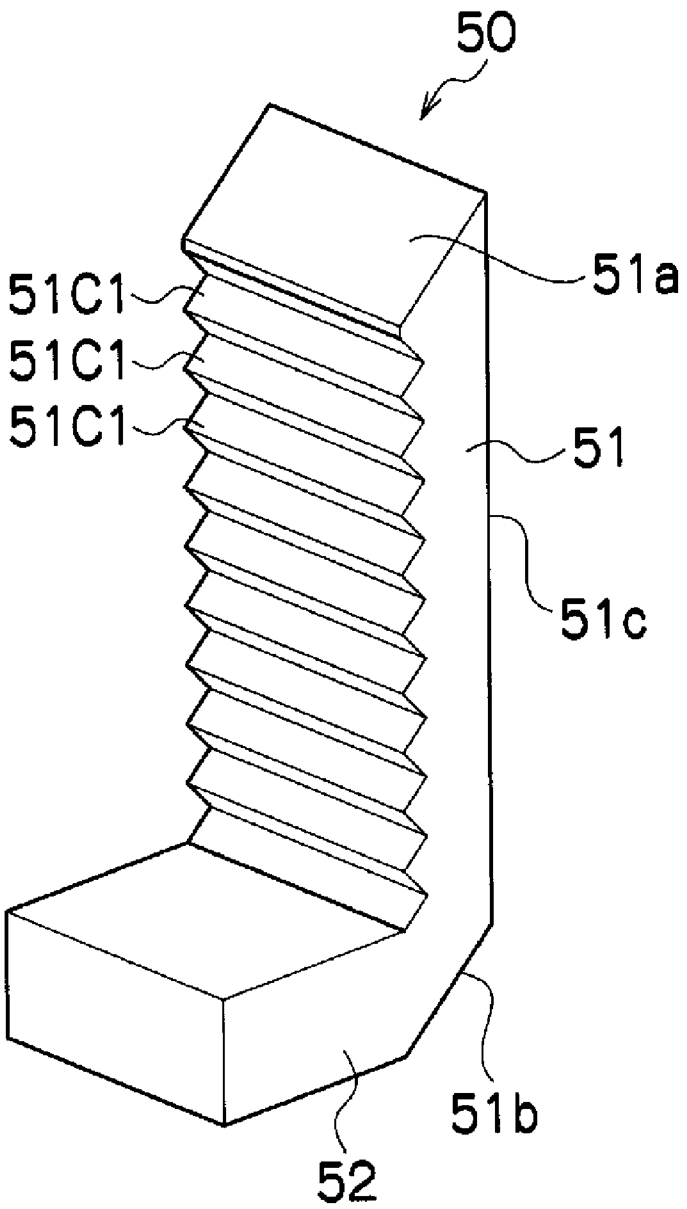
FIG. 5 is a partial perspective view illustrating the configuration of the vertical light emitting portion of the plate light guiding portion of the lighting assembly of FIG. 1.

In the present exemplary embodiment, as shown in FIGS. 3 and 5, a plurality of cut surfaces 51*c*1 can be provided on the rear surface of the plate light guiding portion 51 near the LED 32. Herein, the cut surfaces 51*c*1 can be formed of a plurality of surfaces extending in a horizontal direction by a prism cutting technique. The surfaces, which correspond to and are one example of the individual reflective light emitting surfaces, may be referred to collectively as a "vertical light emitting portion 51*c*" hereinafter. In the present exemplary embodiment as shown in FIG. 1 or the like, two vertical light emitting portions 51*c* are provided, for example. It should be noted that the plate light guiding portion 51 may not have cut surfaces 51*c*1 on the rear surface of the plate light guiding portion 51 other than the areas where the vertical light emitting portions 51*c* are provided.

As shown in FIG. 2, the LED 32 may be positioned between the end face of the incident light guiding portion 52 (which continues to the vertical light emitting portion 51*c*) and the reflective surface 33*b* of the reflector 33. In this case, the reflective surface 33*b* can extend substantially in the same direction as that of the incident light guiding portion 52. The plate light guiding portion 51 can have a surface where cutting patterns or the like are provided for the purpose of decoration.

A description will now be given of the light paths in the reflector type headlight section 30 as configured above.

Figure 6:
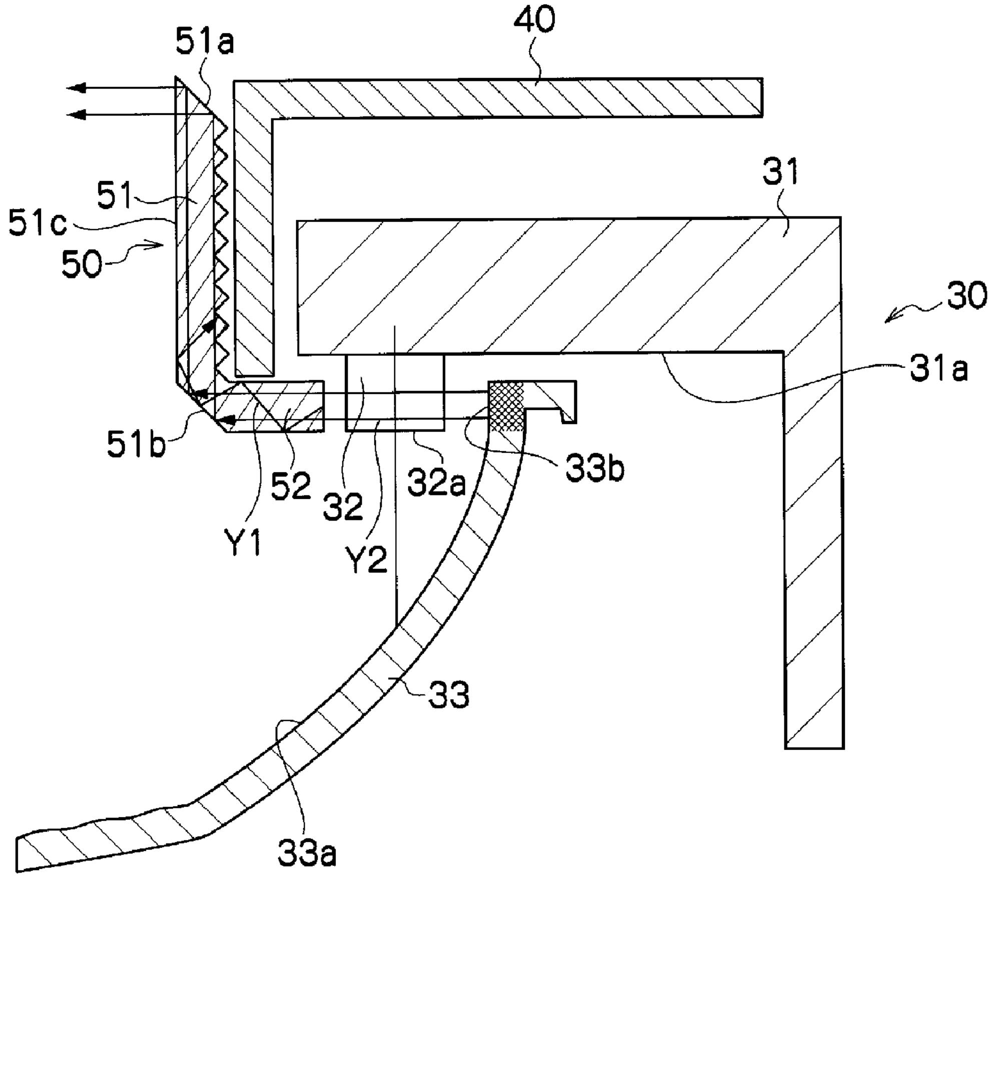
FIG. 6 is a diagram illustrating light paths for reflected parallel light rays from the reflector and direct light rays from the LED for the lighting assembly of FIG. 1.

The leakage light rays from the LED 32 can directly enter the incident light guiding portion 52 of the light guiding lens 50 as shown by the arrow Y1 in FIG. 6. At the same time, the leakage light rays from the LED 32 can be reflected by the reflective surface 33*b* to be made parallel light rays which enter the incident light guiding portion 52 as shown by the arrow Y2 in FIG. 6.

The light rays Y1 directly entering the incident light guiding portion 52 can be reflected by the lower total reflective surface 51*b* and enter the plate light guiding portion 51. The incident light rays Y1 can be repeatedly reflected within the plate light guiding portion 51 and enter the plurality of cut surfaces 51*c*1 that constitute the vertical light emitting portion 51*c*. Then, the reflected light rays from the plurality of cut surfaces 51*c*1 can be emitted from the entire vertical light emitting portion 51*c*. Accordingly, when the vehicle lighting assembly is viewed from the front side of the vehicle body, the vertical light emitting portion 51*c* can appear as if it entirely emits light.

The reflected parallel light rays Y2 can enter the incident light guiding portion 52, can be reflected by the lower total reflective surface 51*b*, and then can enter the plate light guiding portion 51. The incident parallel light rays Y2 can enter the upper total reflective surface 51*a* that constitutes the transversal light emitting portion 51*a*. Then, the parallel light rays Y2 can be totally reflected by the upper total reflective surface 51*a*. Accordingly, when the vehicle lighting assembly is viewed from the front of the vehicle body, the transversal light emitting portion 51*a* can appear as if it entirely emits light. As a result, the vertical light emitting portion 51*c* and the crossing transversal light emitting portion 51*a* can appear as if they emit light entirely about their total surface area which constitutes the light guiding lens 50. Among other benefits and characteristics, this configuration can provide a novel, improved appearance of the light guiding lens 50.

As described above, the vehicle lighting assembly 100 of the present exemplary embodiment can include a light guiding lens 50 having a transversal light emitting portion 51*a* and a vertical light emitting portion 51*c* as light emitting portions. The vertical light emitting portion 51*c* can be constituted by a plurality of cut surfaces 51*c*1 and can appear as if the vertical light emitting portion 51*c* emit light from substantially its entire outward surface, by being illuminated with direct light rays (leakage light rays) from the LED 32. The transversal light emitting portion 51*a* can appear as if it emits light about substantially its entire outward facing surface, by being illuminated with reflected parallel light rays (leakage light rays from the LED 32) reflected by the reflector 33. Accordingly, the vehicle lighting assembly 100 of the present exemplary embodiment can be constituted by the light guiding lens 50 which does not require any dedicated light source. Furthermore, the leakage light rays from the LED 32 can be effectively utilized (namely, light utilization efficiency can be improved).

In some vehicle lighting assemblies, the projector type headlight section 20 and the reflector type headlight section 30 may be separated away from each other by 15 mm or more. In these cases, the separately disposed headlight sections 20 and 30 cannot be considered as one unit, thereby providing a sense of discomfort or a sense that the light is not working properly. However, the vehicle lighting assembly 100 of the present exemplary embodiment, as shown in FIG. 1, can have the light guiding lens 50 at the extension 40 between the projector type headlight section 20 and the reflector type headlight section 30. In this configuration, the transversal light emitting portion 51*a* and the vertical light emitting portion 51*c* can emit light between the projector type headlight section 20 and the reflector type headlight section 30. According to the configuration of the vehicle lighting assembly 100 of the present exemplary embodiment, even if the projector type headlight section 20 and the reflector type headlight section 30 are separated away from each other by 15 mm or more, the headlight sections 20 and 30 can appear as a united headlight including the light guiding lens 50 that also emits light.

The vehicle lighting assembly 100 of the present exemplary embodiment has been described as to be applied to the vehicle headlight, but it is not limited to such an application. For example, the vehicle lighting assembly can be applied to a rear light, side light, turn or functional light, or other vehicle light.

In the above-described exemplary embodiment, the light source for allowing the transversal light emitting portion 51*a* and the vertical light emitting portion 51*c* of the light guiding lens 50 to emit light can be an LED 32 for use as a main light source for a reflector type headlight section 30, but it is not limited to this particular light source. For example, a bulb such as an incandescent lamp or HID may be used to constitute the reflector type headlight section 30 and the leakage light rays from the light source (other than LEDs) can be utilized. Alternatively, other light sources can also be used as the light source for the projector type headlight section 20 and which allow the transversal light emitting portion 51*a* and the vertical light emitting portion 51*c* of the light guiding lens 50 to emit light.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting assembly comprising:

a light source configured to emit light rays used at least for forming a target light distribution;

a light guiding member made of a transparent or semi-transparent material, the light guiding member including a plurality of individual reflective light emitting surfaces configured to be illuminated with light rays entering the light guiding member from the light source and another reflective light emitting surface configured to be illuminated with parallel light rays entering the light guiding member; and a reflector having a first reflective surface configured to reflect primary light rays emitted from the light source for use in forming the target light distribution and a second reflective surface configured to adjust at least a portion of leak light rays which are not for use in forming the target light distribution so that the leak light rays are made parallel with each other, wherein the light guiding member includes:

a plate light guiding portion extending in a predetermined direction;

an incident light guiding portion provided along one end of the plate light guiding portion, the incident light guiding portion configured to receive light rays from the light source; and a reflective surface provided between the plate light guiding portion and the incident light guiding portion, the reflective surface configured to reflect light rays entering the incident light guiding portion towards the plate light guiding portion, wherein the individual reflective light emitting surfaces are provided on the plate light guiding portion and extend in a direction crossing the predetermined direction, and are configured to be illuminated with light rays reflected by the reflective surface provided between the plate light guiding portion and the incident light guiding portion, and wherein the another reflective light emitting surface is disposed along an opposite end of the plate light guiding portion as compared to the incident light guiding portion, and is configured to be illuminated with the parallel light rays reflected by the reflective surface located between the plate light guiding portion and the incident light guiding portion.

2. A vehicle lighting assembly having a forward illumination direction, including a projector type headlight section and a reflector type headlight section provided adjacent to the projector type headlight section, the reflector type headlight section comprising:

a light source having an optical axis disposed downward so that the optical axis is aligned in a direction substantially perpendicular to the illumination direction;

a reflector provided below the light source, the reflector having a main reflection section and a second reflection section, the main reflection section configured to reflect light rays emitted from the light source and substantially in the optical axis direction toward the illumination direction to form a desired light distribution, the second reflection section configured to reflect light rays emitted from the light source and substantially in directions other than the optical axis direction toward a predetermined direction as parallel light rays; and a light guiding member provided adjacent to the light source and in the illumination direction, the light guiding member being integrally composed of:

an incident light guiding portion facing towards the light source and configured to receive at least one of light rays emitted from the light source directly and parallel light rays reflected by the second reflection section;

a plate light guiding portion extending in a predetermined direction with respect to the incident light guiding portion;

a first reflective surface provided between the incident light guiding portion and the plate light guiding portion and configured to guide light rays from the incident light guiding portion towards the plate light guiding portion;

a plurality of individual reflective light emitting surfaces provided in the plate light guiding portion and configured to reflect at least a portion of the light from the first reflective surface towards the illumination direction; and a second reflective surface serving as another reflective light emitting surface provided in the plate light guiding portion at an end of the plate light guiding portion and spaced from the first reflective surface, the another reflective light emitting surface configured to be illuminated with the light rays reflected from the first reflective surface and to reflect the light rays in the illumination direction.

3. The vehicle lighting assembly according to claim 2, wherein the light guiding member has an L-shaped cross section, and respective sides of the L-shaped cross section correspond to the incident light guiding portion and the plate light guiding portion such that the incident light guiding portion has a longitudinal axis in the L-shaped cross section that is substantially perpendicular to a longitudinal axis in the L-shaped cross section of the plate light guiding portion.

4. The vehicle lighting assembly according to claim 2, wherein the plurality of individual reflective light emitting surfaces are formed on a rear surface of the plate light guiding portion with respect to the illumination direction.

5. The vehicle lighting assembly according to claim 3, wherein the plurality of individual reflective light emitting surfaces are formed on a rear surface of the plate light guiding portion with respect to the illumination direction.

6. The vehicle lighting assembly according to claim 2, wherein the first reflective surface is provided at an angle of 45 degrees with respect to the optical axis of the light source.

7. The vehicle lighting assembly according to claim 3, wherein the first reflective surface is provided at an angle of 45 degrees with respect to the optical axis of the light source.

8. The vehicle lighting assembly according to claim 4, wherein the first reflective surface is provided at an angle of 45 degrees with respect to the optical axis of the light source.

9. The vehicle lighting assembly according to claim 5, wherein the first reflective surface is provided at an angle of 45 degrees with respect to the optical axis of the light source.

10. The vehicle lighting assembly according to claim 6, wherein the second reflective surface is provided at an angle of 45 degrees with respect to the optical axis and is substantially parallel with the first reflective surface.

11. The vehicle lighting assembly according to claim 7, wherein the second reflective surface is provided at an angle of 45 degrees with respect to the optical axis and is substantially parallel with the first reflective surface.

12. The vehicle lighting assembly according to claim 8, wherein the second reflective surface is provided at an angle of 45 degrees with respect to the optical axis and is substantially parallel with the first reflective surface.

13. The vehicle lighting assembly according to claim 9, wherein the second reflective surface is provided at an angle of 45 degrees with respect to the optical axis and is substantially parallel with the first reflective surface.

14. A light guiding lens for use in a vehicle lighting assembly, comprising:

a plate light guiding portion extending in a predetermined direction;

an incident light guiding portion provided along one end of the plate light guiding portion, the incident light guiding portion configured to receive light rays from a light source;

a reflective surface provided between the plate light guiding portion and the incident light guiding portion, the reflective surface configured to reflect the light rays entering the incident light guiding portion towards the plate light guiding portion;

a plurality of individual reflective light emitting surfaces provided on the plate light guiding portion and extending in a direction crossing the predetermined direction, the individual reflective light emitting surfaces configured to be illuminated with light rays reflected by the reflective surface provided between the plate light guiding portion and the incident light guiding portion; and another reflective light emitting surface provided along an opposite end of the plate light guiding portion as compared to the incident light guiding portion, the another reflective light emitting surface configured to be illuminated with at least a portion of the light rays reflected by the reflective surface.

15. The light guiding lens for use in a vehicle lighting assembly according to claim 14, wherein the another reflective light emitting surface is configured to be illuminated by parallel light rays reflected by the reflective surface.

16. The light guiding lens for use in a vehicle lighting assembly according to claim 14, wherein the reflective surface and the another reflective surface are substantially parallel with each other.

17. The light guiding lens for use in a vehicle lighting assembly according to claim 14, wherein the reflective surface is at an angle of approximately 45 degrees with respect to the predetermined direction.

18. The vehicle lighting assembly according to claim 2, wherein the projector type headlight section is spaced from the reflector type headlight section.

* * * * *